March 13, 1956  W. F. ALLER  2,737,727
SIZE GAUGING DEVICE
Filed Oct. 5, 1950
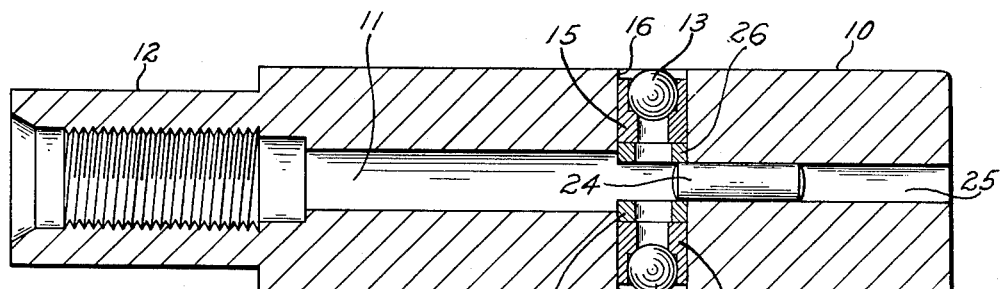
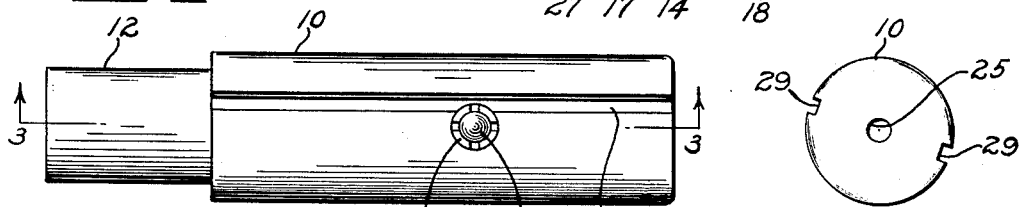
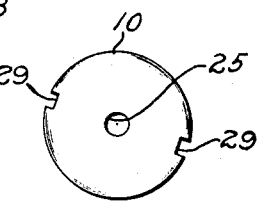
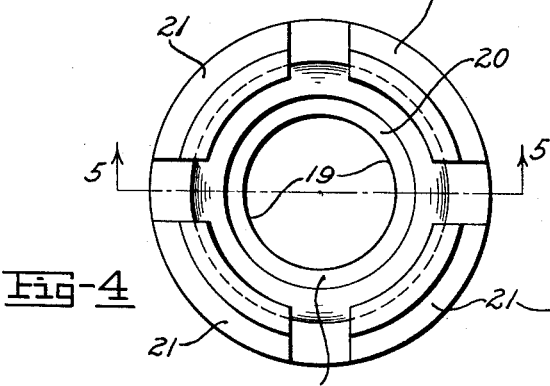
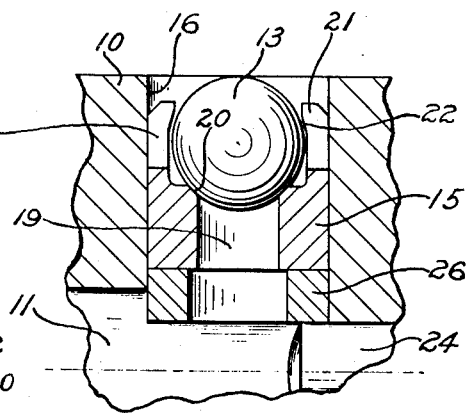
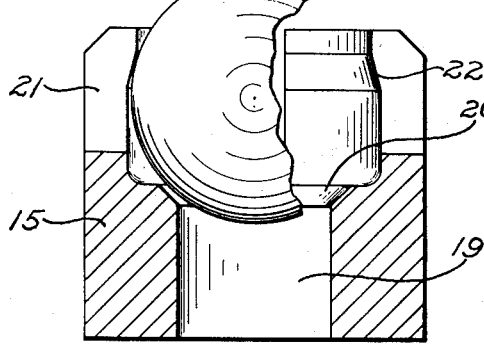
INVENTOR.
W. F. Aller
BY Edward J. Noe
atty.

United States Patent Office 2,737,727
Patented Mar. 13, 1956

2,737,727

SIZE GAUGING DEVICE

Willis Fay Aller, Dayton, Ohio, assignor to The Sheffield Corporation, Dayton, Ohio, a corporation of Ohio Application October 5, 1950, Serial No. 188,533

25 Claims. (Cl. 33—178)

This invention relates to form or dimension gauges and more particularly to gauge heads for use with air gauges or the like which are responsive to changes in the flow of air or other fluid under pressure.

One object of the invention is the provision of a gauge head of the character mentioned adapted to accurately gauge or measure the inside diameter of a circular bore even though more pressure may be exerted on one side of the gauge head than the other with respect to the work being gauged.

Another object is the provision of a gauge head of simple construction, embodying a plurality of work contacting balls that conjointly control the flow of air through the gauge head, the balls being carried for limited gauging movement by ball retainers in the gauge head.

Another object is the provision of a gauge head having work contacting balls arranged in retainers mounted in the gauge head and relatively located by locating or spacing means arranged between the ball retainers.

Another object is the provision of a ball and retainer assembly, of simple form and capable of convenient application in an air gauging mechanism.

Other objects and advantages of the invention will be apparent from the following description, the appended claims and the accompanying drawing, in which, Fig. 1 is a side elevation of a gauge head embodying the present invention;

Fig. 2 is an end view of the gauge head;

Fig. 3 is a central transverse section on an enlarged scale taken on line 3—3 of Fig. 1;

Fig. 4 is an end view of one of the ball retainers shown on an enlarged scale;

Fig. 5 is a section on the line 5—5 of Fig. 4 showing a portion of the ball in place; and Fig. 6 is a fragmentary section on an enlarged scale through the retainer supporting portion of the gauge head.

Heretofore gauge heads of this nature have been suggested in which spring pressed work contacting balls have been used to control the air flow between outer portions of the balls and ball seats where the ball seats are disposed close to the outer periphery of the gauge head and outward of the ball centers. Such constructions are however objectionable because the ball seats rapidly become worn or marred because of the entrance of steel chips, dirt and the like between the balls and ball seats, the dirt being trapped when the gauge head is removed from the work. Spring pressure upon the work contacting balls has prevented their free rotation and caused wear both from the contact between the springs and balls and through the sliding of the balls along a work surface in a gauging operation.

In the present invention work contacting balls are arranged in a gauge head body structure so that the balls are freely rotatable and urged outward only by the issuing gauging air whereby the balls can roll freely rather than slide along on the work. Also in the present invention the air flow is controlled by the cooperation of the inner portion of the balls and ball seats which are disposed below the balls and away from the gauge head periphery so that the ball seats and balls are protected from dirt, work chips and the like and so that the balls will move away from the ball seat when the gauge head is removed from the work and the issuing air will give the gauge head a self-cleaning action.

Referring more particularly to the drawing in which the same reference numerals are applied to like parts in the different views, the work engaging member as herein shown consists of relatively fixed parts forming a body structure and a pair of balls arranged in the body structure. The body structure in which there are no movable parts operable in a gauging operation, includes a body 10 of generally cylindrical form and adapted to enter a round hole to gauge the diameter of the hole, the diameter of the body being slightly less than the diameter of the hole to be gauged. It will be obvious however, that the invention is not limited to the gauging of internal diameters of a workpiece.

The body 10 is provided with an axially extending fluid supply path 11 and has an end portion 12 that can be conveniently connected to a conduit that extends from a fluid flow gauging device of any suitable character capable of measuring the flow taking place through the passage 11 or indicating such flow in terms of physical dimensions. The flow through the passage 11 is controlled by a plurality of balls 13 and 14 which are held outwardly in contact with the work by means of the air pressure existing on the inner portions of these balls.

The ball 13 which is preferably of steel or suitable hard metal is arranged in a ball retainer 15 which has a press fit in a radially extending passage 16 in the body. A similar passage 17 carries ball retainer 18 for the ball 14, the two retainers being of similar construction. It is preferred that the two passages 16 and 17 be in axial alignment, these passages being made merely by drilling the hole entirely through the body member to provide a diametrical bore.

The retainer 15 has a passage 19, a ball seat 20 that cooperates with the inner portion of the ball 13, and a plurality of outwardly extending arcuate arms 21. The inner portions of the arms 21 are spaced apart so they are just out of contact with the ball and serve as guides to keep the ball aligned centrally of the retainer. The outer ends of the arms are deflected inwardly as indicated at 22 so that the terminal portions of the arms are spaced apart diametrically a distance that is slightly less than the diameter of the ball and thus act to limit the outward travel of the ball although the ball is capable of limited free movement in a direction axially of the retainer. Since the arms 21 are supported only at their inner ends they are capable of slight outward flexure before the retainer is applied to the body member and the ball is merely snapped in place by forcing it into position. As soon as the major diameter of the ball passes the outer ends of the arms in this assembly operation, the arms spring back into a normal position and the retainer together with the ball is then pressed into the bore or passage in the body.

Before applying the ball retainers together with the balls a stop plug 24 is pressed into the passage 25 which forms a continuation of the path 11, the stop plug 24 preventing leakage through this continuation passage. It is pressed in far enough so the end of the plug extends partly into the transverse bore and serves as a stop for locating rings 26 and 27 fitting slidably in the bore and of such thickness as to locate the ball retainers in proper position so that the balls, when resting against their respective seats in the ball retainers, will be substantially flush with the outside of the body 10, indicated by the dotted line in Fig. 5. In a gauging operation when air pressure is applied to the passage 11 the balls will be moved outwardly beyond the dotted line position and contact with the work.

The work diameter will control the distance between the inner portions of the balls and the ball seats 20 so that the annular paths along the valve seats will conjointly control the amount of flow taking place through the gauge head. This air leaking out past the balls flows through the space between the balls and the arms 21 and then along axially extending slots 29 in the gauge head.

In applying a gauge head of this character to the work or when the work is applied to the gauge head, if the gauge head is fixed, a greater pressure may be applied to one side of the work than the other so that the two annular paths past the two balls may not be exactly the same. However, as it is the conjoint action of the two fluid leakage paths past the two balls that is effective in controlling the total flow through the gauge head, it will be obvious that if the gauge head is not exactly centered with the work, an accurate control of the fluid leakage will take place nonetheless. Under these conditions somewhat more flow will take place past one of the balls than the other but the total flow will remain the same as if the gauge head were exactly centered.

It will be obvious that repeated gauging applications will cause no substantial wear on the work contacting elements of the gauge since these elements are freely rotatable and the wear is distributed, the wear, moreover, being reduced because of the free rotation which takes place as the gauge head is applied or withdrawn. The device is extremely simple and easily manufactured, assembled and disassembled and by making the spacers 26 and 27 of different thickness, it will be obvious that the ball retainers can be adapted to body members of different diameters. A particular advantage of the present invention is the fact that the inner surface of the ball engages a ball seat which is distantly removed from the work and atmosphere and which is protected from extraneous dirt, work chips or the like.

To remove or disassemble the parts it is merely necessary to push out the plug 24 and then force either one of the ball retainers inwardly clear through the gauge head from one side to the other, the retainer that is pushed in carrying the spacers 26 and 27 and the other ball retainer along with it. When assembled, the cylindrical outer portions of the ball retainers will fit against the cylindrical bore of the plug so that the balls will be positively retained against excessive outward movement. Since heavy springs need not be applied to the balls the light gauging pressure that the air pressure exerts on the balls will permit the gauging of soft materials that might otherwise be marred by strongly pressed or non-rotating work contacting elements.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gauge head of the character described adapted for use with an air gauge or the like, comprising a body having a fluid supply path and transverse passages in communication therewith, a ball arranged for rotation within and for limited movement in a direction axially of each of said passages, the outer portions of the balls extending beyond the adjacent portions of the body in a gauging operation for contact with the work to be gauged, a retainer for each ball, each retainer having a tight fit in its respective passage and having an outer portion limiting outward travel of the ball and having an inner portion integrally fixed to the outer portion cooperating with the inner portion of its respective ball to control the flow through said fluid supply path.

2. A gauge head of the character described adapted for use with an air gauge or the like comprising a body having a fluid supply path and a transverse bore in communication with said path, a pair of diametrically opposed balls arranged for rotation within and for limited movement axially of said bore, the outer portions of the balls extending beyond the adjacent portions of the body for contact with the work to be gauged, a pair of retainers one for each ball, each retainer having a tight fit in the bore at opposite ends of the bore and each retainer having an outwardly facing annular seat portion cooperating with its ball, there being an opening within said seat forming the sole passage of fluid from said supply path to said ball so that said retainer portions and balls can conjointly control the flow through said fluid supply path.

3. A gauge head of the character described adapted for use with an air gauge or the like comprising a body having a fluid supply path and a transverse bore in communication therewith, a ball retainer at each end of said bore, a ball retained by each ball retainer and rigid spacing means physically interposed between the ball retainers and in physical contact with the inner portions thereof to locate the ball retainers in proper position, allowing projection of the balls into rolling engagement with the work and control of the flow past the balls to atmosphere.

4. A gauge head of the character described adapted for use with an air gauge or the like comprising a body having a fluid supply path and a transverse bore in communication therewith, a ball retainer at each end of said bore and applicable to said bore from the outer portion thereof with a press fit in the bore, a ball retained by each ball retainer, a spacing ring engaging the inner end of each ball retainer and an axially removable plug interposed in the body between the spacing rings.

5. A gauge head of the character described adapted for use with an air gauge or the like comprising a body having a fluid supply path and a transverse bore in communication therewith, a ball retainer fitting within each end of said bore, a ball rotatably arranged in each ball retainer and having limited movement axially thereof, the outer portions of the balls extending beyond the adjacent portions of the body for contact with the work to be gauged, said ball retainers each having an outwardly facing annular seat portion cooperating with the inner portion of its ball and having outer spaced arms integral with said seat portions, the outer portions of said arms being normally spaced apart a distance less than the maximum diameter of the ball to retain the ball against excessive outward movement.

6. For use in a gauge head adapted for diametrical measurements, an assembly comprising a ball retainer and a ball, the ball retainer having an annular seat for cooperation with the ball to afford fluid leakage dependent upon the relative position of the ball and the retainer, the retainer having spaced arms for guiding the ball towards and from the seat, the inner end of each arm being integral with the seat forming portion of the retainer and the outer portions of the arms being spaced apart a distance less than the ball diameter, the arms having inherent flexibility such that the arms prior to assembly in the gauge head will deflect sufficiently to permit the ball to be forced into position within the arms.

7. A gauge head of the character described adapted for use with an air gauge or the like comprising a body having a fluid supply path and a passage in communication therewith, a ball retainer in said passage, a ball rotatable in said ball retainer, said retainer having a cylindrical wall portion fitting into said passage and an outwardly facing annular seat for cooperation with the inner side of the ball to control flow from the fluid supply path towards the ball, said retainer having ball retaining arms extending axially from said wall portion, the outer portions of the arms being spaced apart a distance less than the ball diameter and limiting the travel of the ball away from the seat, the outer portion of the ball extending beyond the adjacent portions of the body in a gauging operation for contact with the work to be gauged and for resulting adjustment of the distance between the ball and the seat.

8. A gauge head of the character described adapted for use with an air gauge or the like comprising a body having a fluid supply path and a passage in communication therewith, a ball retainer in said passage and a ball rotatable in said retainer, said retainer having an outwardly facing annular seat for cooperating with the inner portion of the ball to control the flow past said ball, said retainer having a retaining portion in fixed relation with the seat forming portion and limiting the travel of the ball away from the seat to project beyond the gauge head surface and into rolling engagement with the work when the gauge head is applied or removed, the ball being freely movable and subjected only to air pressure in its movement towards and from the seat except as controlled by the work with which it contacts.

9. For use in a cylindrical opening of a gauge head a ball retainer, the ball retainer having an annular seat provided in a cylindrical hollow wall, the wall having arms having inherent flexibility extending axially therefrom with the terminal ends of the arms projecting towards one another to provide ball retainers spaced apart normally a distance less than the ball diameter, the outer portions of said arms adjacent the terminal ends thereof when thus normally spaced lying within the confines of the cylindrical surface defined by said wall, and forming axial continuations of the cylindrical wall whereby with the ball retainer inserted in the cylindrical opening of the gauge head the arms cannot be spread apart to release the ball.

10. A gauge head of the character described adapted for use with an air gauge or the like, comprising a body structure of circular cross section and a plurality of orifice controlling balls which are the only elements of the gauge head movable during a gauging operation, the body structure having an axially disposed fluid supply passage and a plurality of radial branch passages extending therefrom, one for each ball, one of said balls being carried for rotation and movement along the axis of each of said branch passages, an orifice forming annular shoulder in said body structure for each of said balls directly cooperating with the inner portion of the respective ball, retaining means forming a part of said body structure engageable by outward portions of each ball to retain said balls in said body structure and limit the travel of the balls away from the orifice forming annular shoulders to such an extent that the outer portions of the balls extend beyond the surface of the body structure in a gauging operation for contact with the work being gauged and for direct rolling engagement along the work when the gauge head is applied or removed, the relationship between the balls and the orifice forming shoulders being such that the air issuing through the orifices is the sole force urging the balls into contact with the work.

11. A gauge head of the character described adapted for use with an air gauge or the like, said gauge head having a substantially circular cross section, a fluid supply passage in said gauge head and a radial passage extending therefrom, a ball carried for rotation and movement axially of said radial passage, an annular seat in said gauge head directly cooperating with the inner portion of the ball to control the flow through the radial passage, retaining means forming a part of said gauge head engageable by the outward portion of said ball to retain said ball in said gauge head and limit the travel of the ball away from the annular seat to such an extent that the outer portion of the ball extends beyond the surface of the gauge head in a gauging operation for contact with the work being gauged and for direct rolling engagement along the work when the gauge head is applied and removed, the relationship between the ball and the annular seat being such that the air passing through the radial passage is the sole force urging the ball into contact with the work.

12. A gauge head of the character described adapted for use with an air gauge or the like, said gauge head having a substantially circular cross section, a plurality of flow controlling balls which are the only elements of the gauge head movable during a gauging operation, the gauge head having a fluid supply passage and transverse passages in communication therewith, one of said balls being carried for rotation and limited movement in a direction axially of each of said transverse passages, an annular seat in said gauge head for cooperation with inner portions of each of said balls so that fluid flow through the gauge head is determined conjointly by the space between the balls and the seats, means in said gauge head for engagement with outward portions of each ball to retain said balls in said gauge head and limit the travel of the balls away from the annular seats to such an extent that the outer portions of the balls may extend beyond the surface of the gauge head in a gauging operation for contact with the work being gauged and for direct rolling engagement along the work when the gauge head is applied and removed.

13. A gauge head of the character described adapted for use with an air gauge or the like, comprising a body of substantially circular cross section and a plurality of flow controlling balls which are the only elements of the gauge head movable during a gauging operation, the body having a fluid supply passage and a plurality of transverse passages in communication therewith, said body having means carrying each of said balls in the gauge head for rotation and limited movement in a direction axially of each of said transverse passages, said means providing an annular ball seat in each of said transverse passages coaxial therewith, directly cooperating with the inner portion of each respective ball so that fluid flow through the body is determined conjointly by the space between the balls and seats, said means also providing a stop engageable by outward portions of each ball to retain said balls in said body and limit the travel of the balls away from the annular ball seats to such an extent that the outer portions of the balls may project beyond the surface of the body in a gauging operation for contact with the work being gauged and for direct rolling engagement along the work when the gauge head is applied and removed.

14. A gauge head of the character described adapted for use with an air gauge or the like, comprising a body of substantially circular cross section and a plurality of orifice controlling balls which are the only elements of the gauge head movable during a gauging operation, the body having an axially disposed fluid supply passage and a plurality of transverse passages in communication therewith, one of said balls being carried for rotation and movement axially of each of said transverse passages, an annular ball seat in each of said transverse passages arranged coaxial therewith and directly cooperating with the inner portion of the respective ball, retaining means carried in said body engageable by outward portions of each ball to retain said balls in said body and limit the travel of the balls away from the annular ball seats to such an extent that the outer portions of the balls may extend beyond the surface of the body in a gauging operation for contact with the work being gauged and for direct rolling engagement along the work when the gauge head is applied and removed, the relationship between the balls and the ball seats being such that the air issuing through the transverse passages is the sole force urging the balls into contact with the work.

15. In a dimension gauge, a gauge head having fluid conduits therein extending to the work engaging surface thereof, said conduits having orifices within recesses in the surface of the gauge head and positioned below said work engaging surface of said head, conical seats formed at the orifices of said fluid conduits within the gauging head, air escape channels intersecting said fluid conduits, balls adjacent said seats, and retaining means for said balls pressed within the recesses in the gauging head permitting limited free movement of said balls toward and from said seats so that upon application and removal of the gauge head the balls roll with direct contact along the work.

16. In a dimension gauge, a gauge head having fluid conduits therein extending to the work engaging surface thereof, said conduits having orifices below the surface of said head, seats formed at the orifices of said fluid conduits, said head being recessed at said orifices, balls within said recesses adjacent said seats, and retaining means for said balls housed within said recesses and permitting limited movement of said balls beyond the work engaging surface of the head so that upon application and removal of the gauge head the balls roll with direct contact along the work.

17. In a dimension gauge, a gauge head having fluid conduits therein extending to the work engaging surface thereof, said conduits having orifices below the surface of said head, conical seats formed at the orifices of said fluid conduits, said head being recessed surrounding said orifices, balls within said recesses mounted for limited movement toward and from said seats, and annular retaining means for said balls permitting limited movement of said balls beyond the work engaging surface of the head so that upon application and removal of the gauge head the balls roll with direct contact along the work.

18. In a dimension gauge, a gauge head having a fluid supply passage therein extending toward the gauge head surface, an annular seat at the outer end of the fluid supply passage in depressed relationship with the surface of the gauge head, a flow controlling ball the position of which is controlled by direct contact with the work, said gauge head having a ball receiving pocket outwardly of said annular seat in which said ball is carried for free rotation along the work as the gauge head is applied and removed during a gauging operation and for limited work controlled movement toward and from said annular seat for control of fluid flow along said passage and through said annular seat, so that the flow controlling ball normally projects beyond the gauge head surface into direct contact with the work and for rolling engagement along the work when the gauge head is applied and removed.

19. In a dimension gauge a gauge head having a fluid supply passage therein extending toward the gauge head surface, an annular seat at the outer end of the fluid supply passage in depressed relationship with the surface of the gauge head, a work contacting and flow controlling ball, said gauge head having means carrying said ball adjacent the outer end of said passage for free rotation and movement inward toward and outward from said annular seat for control of fluid flow past said seat by an inner portion of said ball and limiting the outward movement of the ball to project slightly beyond the gauge head surface for direct contact with the work and free rolling engagement as the gauge head is applied and removed in a gauging operation, the relationship between the ball and annular seat being such that fluid issuing through the seat is the sole force urging the ball into contact with the work.

20. A gauge head for dimension gauging operations having a fluid conduit therein extending to the surface of the gauge head, an annular seat spaced below the surface of the gauge head, a work contacting and flow controlling ball carried concentrically in said conduit outward of said annular seat for free rotation and movement toward and from the annular seat, the inward portions of the ball cooperating directly with the annular seat for flow control, a fluid escape channel in the outer surface of said body communicating laterally with said conduit at a point outward of the annular seat, and limit means engageable by outward portions of the ball limiting the outward travel of the ball to the extent that the outer portions of the ball may project slightly beyond the surface of the gauge head for direct contact with the work to be gauged and free rolling engagement as the gauge head is applied and removed in a gauging operation.

21. In a dimension gauge, a gauge head adapted for use with an air gauge or the like, comprising: a generally cylindrical body having a fluid supply path therein and a diametral conduit in communication with said fluid supply path extending to opposite surfaces of said body and having a central portion and an outer terminal portion at each end thereof, a pair of work contacting and flow controlling balls, one of said balls being carried for free rotation in and for limited movement along each outer terminal portion of said conduit, an annular seat at each end of the central portion of the conduit cooperating with inward portions of each respective ball to control the flow of fluid along the conduit and through the annular seat, means at the outer end of each terminal portion of the conduit cooperating with outer portions of the balls to limit the outward movement thereof to the extent that the outer portions of the balls may project slightly beyond the adjacent portion of the body for direct contact with the work to be gauged and free rolling engagement along the work as the gauge head is applied and removed in a gauging operation, and air escape channels in the outer surface of said body having lateral communication with the terminal conduit portions.

22. A gauging head of the character described adapted for use with an air gauge or the like comprising a generally cylindrical body having a fluid supply path communicating with a radially disposed passage extending toward the gauge head surface and terminating below the surface of the gauge head, a work contacting and flow controlling ball at the outer end of said passage and cooperating therewith to control flow of fluid through the passage, a retaining means housed within the gauge head and guiding said ball outwardly of the outer end of said passage for direct contact with the work and free rotation along the work as the gauge head is applied and removed in a gauging operation, and for limited work controlled movements towards and from the outer end of said passage.

23. A gauging head of the character described adapted for use with an air gauge or the like comprising a generally cylindrical body having a fluid supply path communicating with a diametrally disposed passage terminating at each end below the surface of the gauge head, a work contacting and flow controlling ball at each outer end of said passage and cooperating therewith to control flow of fluid through the passage, retaining means applied inwardly with press fits in the gauge head at the outer ends of said passage and guiding the balls outwardly of the outer ends of said passage for free rotation and for limited work controlled movements inward toward the outer ends of said passage and outward into direct contact with the work to be gauged and free rolling engagement therealong as the gauge head is applied and removed in a gauging operation, each of said retaining means having an extent along an axial continuation of said passage greater than the radius of the controlling balls, and exhaust channels in the surface of the gauge head having lateral communication through the retaining means for exhaust flow.

24. A gauging head of the character described adapted for use with an air gauge or the like, comprising: a generally cylindrical body having a fluid supply path therein and a diametral bore of constant diameter from one side of the head to the other intersecting said fluid supply path, a work contacting and flow controlling ball at each end of said bore, a ball retaining means pressed in each end of said bore, hollow spacing means interiorly communicating with said fluid supply path physically interposed in said bore between the ball retaining means and in physical contact with the inner portions thereof to locate the ball retaining means in proper position, an annular seat in one of said means and spaced inwardly at each end of said bore for cooperation with an inner portion of each respective ball to control fluid flow through the gauging head, each of said ball retaining means guiding a ball for free rotation and for limited movement along the axis of said bore inward toward the annular seat and outward into contact with the work and rolling engagement therealong as the gauge head is applied and removed in a gauging operation.

25. A gauging head of the character described adapted for use with an air gauge or the like, comprising: a generally cylindrical body having a fluid supply path therein and a diametral bore of constant diameter from one side of the head to the other intersecting said fluid supply path, a work contacting and flow controlling ball at each end of said bore, a ball retaining means pressed in each end of said bore, hollow spacing means interiorly communicating with said fluid supply path physically interposed in said bore between the ball retaining means and in physical contact with the inner portions thereof to locate the ball retaining means in proper position, two annular seats, one seat being spaced inwardly at each end of said bore for cooperation with an inner portion of each respective ball for control of fluid flow through the gauging head, each of said ball retaining means guiding a ball for free rotation and for limited movement along the axis of said bore inward toward the annular seat and outward to the extent that the outer portion of the ball may project slightly beyond the adjacent surface of the body for contact with the work to be gauged and rolling engagement therealong as the gauge head is applied and removed in a gauging operation, the relationship between the balls and annular seats being such that fluid issuing through the annular seats is the sole force urging the balls into contact with the work, and exhaust channels in the surface of the gauging head having lateral communication through the retaining means for exhaust flow.

References Cited in the file of this patent

UNITED STATES PATENTS

| | | |
|---|---|---|
| 1,157,389 | Hess | Oct. 19, 1915 |
| 1,170,255 | Hess | Feb. 1, 1916 |
| 1,448,373 | Bartholdy | Mar. 13, 1923 |
| 1,540,473 | Hitchcock | June 2, 1925 |
| 1,788,416 | Wasberg et al. | Jan. 13, 1931 |
| 2,020,134 | Bryant | Nov. 5, 1935 |
| 2,144,952 | Williams et al. | Jan. 24, 1939 |
| 2,306,469 | Rupley | Dec. 29, 1942 |
| 2,354,255 | Gillum et al. | July 25, 1944 |
| 2,357,569 | Wright et al. | Sept. 5, 1944 |
| 2,360,705 | Moore | Oct. 17, 1944 |
| 2,501,130 | Kuppersmith | Mar. 21, 1950 |
| 2,706,339 | Aller | Apr. 19, 1955 |

FOREIGN PATENTS

| | | |
|---|---|---|
| 113,405 | Australia | Jan. 1, 1941 |
| 623,050 | Great Britain | May 11, 1949 |